(12) United States Patent
Kim et al.

(10) Patent No.: US 9,181,990 B2
(45) Date of Patent: Nov. 10, 2015

(54) CLUTCH ACTUATOR FOR VEHICLE

(71) Applicants: Hyundai Motor Company, Seoul (KR); PYONG HWA VALEO CO., LTD., Daegu (KR)

(72) Inventors: Tae Won Kim, Whasung-Si (KR); Yeon Ho Kim, Whasung-Si (KR); Baek Yu Kim, Whasung-Si (KR); Hee Ra Lee, Whasung-Si (KR); Yoon Sub So, Whasung-Si (KR); Man Dae Hur, Whasung-Si (KR); Jin Ho Jang, Whasung-Si (KR)

(73) Assignees: HYUNDAI MOTOR COMPANY, Seoul (KR); PYONG HWA VALEO CO., LTD., Daegu (KR)

( * ) Notice: Subject to any disclaimer, the term of this patent is extended or adjusted under 35 U.S.C. 154(b) by 219 days.

(21) Appl. No.: 13/919,617

(22) Filed: Jun. 17, 2013

(65) Prior Publication Data
US 2014/0166429 A1 Jun. 19, 2014

(30) Foreign Application Priority Data
Dec. 17, 2012 (KR) .......................... 10-2012-0147911

(51) Int. Cl.
*F16D 23/12* (2006.01)
*F16D 28/00* (2006.01)

(52) U.S. Cl.
CPC ................ *F16D 23/12* (2013.01); *F16D 28/00* (2013.01); *F16D 2023/123* (2013.01); *F16D 2023/126* (2013.01)

(58) Field of Classification Search
CPC ..................... F16D 2023/123; F16D 2023/126; F16D 2023/141; F16D 2125/28; F16D 2125/645; F16D 13/44; F16D 13/42
USPC ........................................... 192/90, 93 B, 97
See application file for complete search history.

(56) References Cited

U.S. PATENT DOCUMENTS

| 8,960,400 B2 * | 2/2015 | Eguchi et al. ................ 192/84.6 |
| 2003/0034212 A1 * | 2/2003 | Gradert et al. ................ 188/167 |
| 2009/0223772 A1 * | 9/2009 | Burkhart et al. .......... 192/70.252 |
| 2013/0334004 A1 * | 12/2013 | Eguchi et al. ................... 192/97 |

FOREIGN PATENT DOCUMENTS

| KR | 10-2007-0037193 A | 4/2007 |
| KR | 10-2008-0004873 A | 1/2008 |
| KR | 10-2008-0020232 A | 3/2008 |

\* cited by examiner

*Primary Examiner* — Robert Hodge
*Assistant Examiner* — Ryan Dodd
(74) *Attorney, Agent, or Firm* — Morgan, Lewis & Bockius LLP

(57) ABSTRACT

A clutch actuator for a vehicle includes a lifting member having a first end connected to a power generator, a middle portion provided with a hinge point, and a second end formed with an inclined plane, the lifting member being linearly moved by receiving a power from the power generator; a guide member provided at one side of the second end of the lifting member to rotate the second end of the lifting member around the hinge point as the lifting member is linearly moved while the inclined planes are supported; and a lever provided at one side of the lifting member and having a first end thereof supported by a clutch housing and a second end rotating around the first end by being pressed by the lifting member according to the movement/rotation of the lifting member, to engage with or release a clutch.

6 Claims, 3 Drawing Sheets

CLUTCH ACTUATOR FOR VEHICLE

CROSS-REFERENCE TO RELATED APPLICATION

The present application claims priority of Korean Patent Application Number 10-2012-0147911 filed Dec. 17, 2012, the entire contents of which application is incorporated herein for all purposes by this reference.

BACKGROUND OF INVENTION

1. Field of Invention

The present invention relates to a clutch actuator and, more particularly, to a clutch actuator for a vehicle capable of reducing the size and the weight of the clutch actuator by employing a simple-structure mechanism for actuating a diaphragm spring applied with the principle of the inclined plane.

2. Description of Related Art

In recent times, vehicle developing companies have been meeting with cutthroat competition for developing various means for improving fuel efficiency, such as hybrid vehicles, electric vehicles, manual transmission automation and the like. Particularly, there has been competitively developed an automated manual transmission which is more cost-competitive than the hybrid or electric vehicles, and whose shift feeling and price are substantially the same as those of a hydraulic automatic transmission and fuel efficiency is improved by 6 to 8 percent.

The automated manual transmission employs a manual shift mechanism of the conventional manual transmission, but is different from the manual shift mechanism of the conventional manual transmission in the actuation of a clutch and gear shift is automatically controlled by an actuator instead of being manually controlled.

FIG. 1 shows the structure of a clutch actuator for performing a shift mechanism of an automated manual transmission. A motor 1 for generating a driving power of the actuator is connected to a pushrod 3 through a reducer 2, and the seesaw movement of a release fork 4 is produced by the linear movement of the pushrod 3 to thereby actuate a release bearing 5.

However, an operating weight for actuating the release bearing quickly increases as an operating stroke becomes larger. Accordingly, the load of motor is required to increase in order to actuate the release bearing against the operating weight. Thus, when the clutch is actuated, a large current is consumed by the motor, thereby deteriorating the improving effect of vehicle fuel efficiency.

Further, since the structure and operating mechanism for actuating the release bearing are complicated, the size of the actuator increases, and thus the cost also increases. As the clutch actuator is separately installed outside the clutch housing, the clutch actuator is weak in noise and vibration when it is operated.

In the meantime, an actuator of a double clutch transmission (DCT) for a car was introduced in Korean Patent Application Publication No. KR 10-2008-0020232 A.

However, the actuator of this conventional technique also consumes a large current when the clutch is actuated. Accordingly, it is difficult to solve the problem that the improving effect of vehicle fuel efficiency is deteriorated.

Matters described as the background art are just to improve the background of the present invention, but it should not be understood that the matters correspond to the related art which has been already known to those skilled in the art.

The information disclosed in this Background section is only for enhancement of understanding of the general background of the invention and should not be taken as an acknowledgement or any form of suggestion that this information forms the prior art already known to a person skilled in the art.

BRIEF SUMMARY

The present invention has been made in an effort to solve the above-described problems associated with prior art.

In one aspect, the present invention provides a clutch actuator for a vehicle, including a lifting member which has a first end connected to a power generating means, a middle portion "h" at which a hinge point is provided, and a second end formed with an inclined plane, the lifting member being linearly moved by receiving a power from the power generating means; a guide member provided at one side of the second end of the lifting member to facilitate rotation of the second end of the lifting member around the hinge point h as the lifting member is linearly moved while the inclined planes are supported; and a lever provided at one side of the lifting member and having a first end supported by a clutch housing and a second end configured to rotate around the first end thereof by being pressed by the lifting member according to the movement or rotation of the lifting member, to engage with or release a clutch.

The power generating means may be a motor, and a rotational movement of the motor is converted to a linear movement of the lifting member by allowing a shaft of the motor to engage with the first end of the lifting member by a structure of a ball screw, to facilitate the linear movement of the lifting member.

The guide member may be a roller.

A guide ball may be provided on one surface of the lifting member supported by the lever to facilitate a smooth movement of the lifting member.

By installing an elastic member at the first end of the lever in an elastic state, an elasticity force is provided to the first end of the lever in an opposite direction to the rotating direction of the second end of the lever when the lever is rotated.

The elastic member may be a spring.

The clutch actuator may be installed in a plural number in the clutch housing, and the clutch actuator may be individually installed in each clutch provided in a double clutch.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
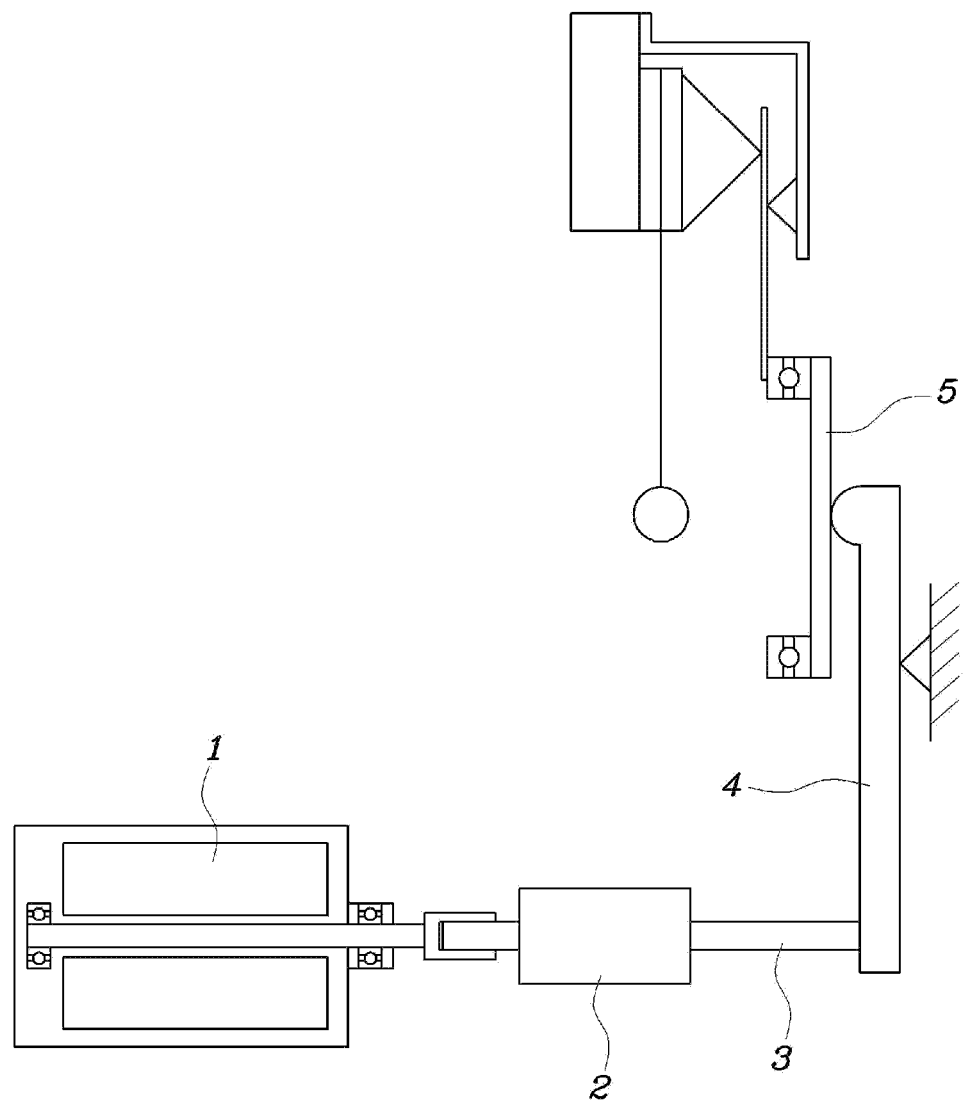
FIG. 1 shows the structure of a conventional clutch actuator.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
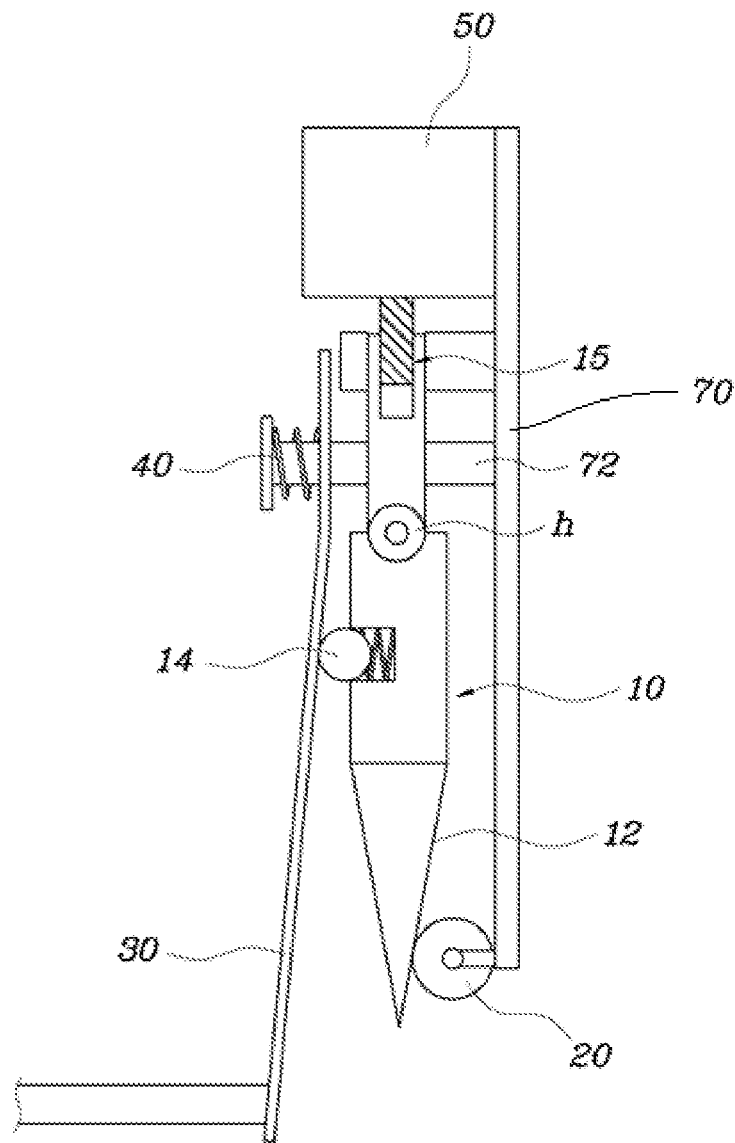
FIG. 2 shows the entire structure of an exemplary clutch actuator in accordance with the present invention.
Figure 3:
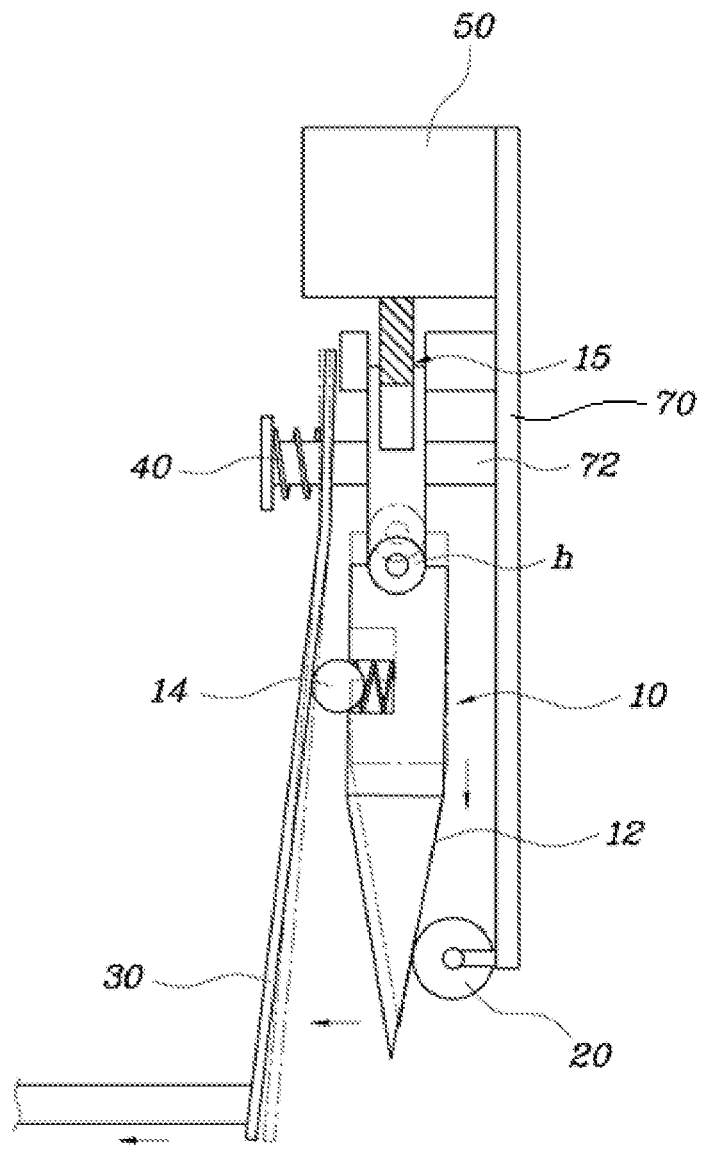
FIG. 3 shows the entire structure of the clutch actuator of FIG. 2 after the clutch actuator is operated.

FIG. 2 shows the entire structure of a clutch actuator in accordance with various embodiments of the present invention, and FIG. 3 shows the entire structure thereof after the clutch actuator is operated.

Referring to FIGS. 2 and 3, the clutch actuator for a vehicle in accordance with various embodiments of the present invention may roughly include a lifting member 10; a guide member 20; and a lever 30.

Specifically, the clutch actuator may include the lifting member 10 having a first end connected to a power generating means or power generator, a middle portion at which a hinge point "h" is provided, and a second end formed with inclined planes 12, the lifting member 10 being linearly moved by receiving a power from the power generating means; the guide member 20 provided at one side of the second end of the lifting member 10 to facilitate rotation of the second end of the lifting member 10 around the hinge point h as the lifting member 10 linearly moved while the inclined planes 12 are supported; and the lever 30 provided at one side of the lifting member 10 and having a first end supported by a clutch housing 70 and a second end configured to rotate around the first end thereof by being pressed by the lifting member 10 according to the movement or rotation of the lifting member 10, thereby engaging with or releasing a clutch.

For further explanation of the above structure, first, the lifting member 10 is connected to the power generating means to supply the power from the power generating means to the lifting member 10, and thus the lifting member 10 is linearly moved by the power supplied from the power generating means. Further, at the middle portion of the lifting member 10, the hinge point h is provided to facilitate rotation of the second end of the lifting member 10 with respect to the first end thereof connected to the power generating means. At this time, a bearing structure may be installed at the hinge point h to facilitate pivoting of the second end of the lifting member 10.

Accordingly, the second member of the lifting member 10 is configured to pivot around the hinge point h, and the inclined planes 12 are formed at opposite sides of the second end of the lifting member 10.

Further, a wear compensating unit may be installed at the first end of the lifting member 10 to compensate the wear of the clutch.

The guide member 20, which is provided at one side of the second end of the lifting member 10, may be installed in the clutch housing 70. The guide member 20 is installed at such a position as to be brought into contact with the inclined planes 12 of the lifting member 10. Accordingly, the lifting member 10 is linearly moved while the inclined planes 12 of the lifting member 10 are in contact with the guide member 20 to thereby facilitate rotation of the second end of the lifting member 10 around the hinge point h.

Here, the guide member 20 is formed of a roller, so that a frictional loss is minimized when the lifting member 10 is moved.

In addition, the lever 30 may be provided at one side of the lifting member 10. The lever 30 is supported in the clutch housing 70 by installing a first end of the lever 30 at a support bar 72 fixed to an inside of the clutch housing 70, and a second end of the lever 30 is connected to an actuating rod (no reference number) to thereby actuate a clutch fork.

Specifically, the second end of the lever 30 may engage with the actuating rod for actuating the clutch fork. The actuating rod engages with the clutch fork, and the clutch fork is installed in such a way as to push or pull the actuating member. Accordingly, the actuating member is operated by the lever 30 to thereby actuate a diaphragm spring.

At this time, the diaphragm spring pushes or releases a pressing plate of the clutch to provide an elasticity power for engaging with or releasing the clutch. The actuating member may be a release bearing or an engagement bearing for engaging with or releasing the clutch by pushing or pulling the diaphragm spring.

With such a configuration, when moved and rotated, the lifting member 10 is moved in a longitudinal direction while pressing one surface of the lever 30, so that the second end of the lever 30 is moved in a direction toward the actuating member with respect to the first end of the lever 30 to thereby engage with or release the clutch.

Here, a guide ball 14 is provided on one surface of the lifting member 10 supported by the lever 30 to facilitate smooth movement of the lifting member 10. Accordingly, a frictional loss is minimized when the lifting member 10 is moved.

In various embodiments of the present invention, the power generating means may be a motor 50. A male screw is formed on a shaft of the motor 50, and a female screw is formed on the first end of the lifting member 10. Accordingly, by allowing the shaft of the motor 50 to engage with the first end of the lifting member 10, a rotational movement of the motor 50 is converted to linear movement of the lifting member 10 to thereby facilitate the linear movement of the lifting member 10.

Here, while the first end of the lifting member 10 in the clutch housing 70 is supported by using the support bar 72, the first end of the lifting member 10 can be installed in such a way as to be slidable with respect to the support bar 72.

Here, the motor 50 may be connected to a transmission control unit (TCU) to receive an electric signal for automatically controlling the motor 50 from the TCU.

As such, by using the electrically operated motor 50 to supply a power for actuating the lever 30, it is possible to solve a problem of disadvantage in fuel efficiency that may be generated due to hydraulic pressure loss and the like in a conventional hydraulic pressure actuator.

In various embodiments of the present invention, by installing an elastic member 40 at the first end of the lever 30 in an elastic state, it is possible to provide an elasticity force to the first end of the lever 30 in an opposite direction to the rotating direction of the second end of the lever 30 when the lever 30 is rotated.

Here, the elastic member 40 can be inserted in the support bar 72 fixed to the clutch housing 70 to thereby support the first lever 30 in the elastic state.

Accordingly, when the second end of the lever 30 is moved while rotated in the direction toward the clutch, the elastic member 40 serves to apply a force for pushing the first end of the lever 30 toward the side of the lifting member 10 to thereby add an elasticity force into a torque of the motor 50 for linearly moving the lifting member 10. This facilitates assistance of the force necessary for the linear movement of the lifting member 10. Accordingly, it is possible to actuate the clutch having a large weight by using the motor 50 having a small capacity.

Further, in various embodiments of the present invention, a plurality of clutch actuators may be installed in the clutch housing 70, and the lever 30 may be individually in each clutch provided in a double clutch. For example, two clutch actuators 1 can be provided together in the clutch housing 70 to thereby serve as one clutch actuator 1 for a double clutch transmission (DCT). In addition, since the clutch actuator is installed in the clutch housing 70, the size and volume of the transmission are reduced to improve the layout of the clutch actuator.

An actuation relationship in accordance with various embodiments of the present invention will be described with reference to FIGS. 2 and 3.

When the motor 50 is electrically automatically controlled to rotate by the TCU, the lifting member 10 is linearly moved by the structure of a ball screw 15.

If so, the inclined planes 12 formed at the second end of the lifting member 10 is roll-moved while generating friction with the guide member 20. At this time, the second end of the lifting member 10 is rotated around the hinge point h formed at the middle portion of the lifting member 10.

Further, the guide ball 14 provided in the lifting member 10 is moved while generating friction with the lever 30 to thereby facilitate rotation of the lever 30.

Accordingly, when the first end of the lever 30 is rotated and moved in a direction toward the lifting member 10, the second of the lever 30 is rotated and moved in a direction toward the clutch to thereby push or pull the actuating member via constituent components such as the clutch fork and the actuating rod engaged with the second end of the lever 30, and the diaphragm spring is actuated by the actuating rod to thereby engage with or release the clutch.

As such, in various embodiments of the present invention, the inclined planes 12 are formed in the lifting member 10, and the inclined planes 12 of the lifting member 10 are moved and rotated while generating friction with the guide member 20 and the lifting member 10 presses the lever 30. Accordingly, the lever 30 is rotated and moved to thereby engage with or release the clutch. Therefore, a mechanism for engaging with and actuating the clutch can be formed to have a simple structure by using the principle of the inclined plane 12. This makes it possible to simplify the structure of the clutch actuator to thereby reduce the volume and weight thereof and the cost.

Further, by installing the elastic member 40 at the first end of the lever 30, an elasticity force is provided in a direction in which the lever 30 is rotated when the lever 30 is rotated to engage with or release the clutch. Accordingly, the elasticity force of the elastic member 40 is added into a torque of the motor 50 required to linearly move the lifting member 10 and thus rotating the lever 30 to thereby serve to assist a necessary force for the linear movement of the lifting member 10. Accordingly, it is possible to actuate the clutch having a large weight by using the motor 50 having a small capacity.

In accordance with various embodiments of the present invention, the inclined planes are formed in the lifting member, and the inclined planes of the lifting member are moved and rotated while generating friction with the guide member, and the lifting member presses the lever. Accordingly, the lever is rotated and moved to thereby engage with or release the clutch. Therefore, a mechanism for engaging with and actuating the clutch can be formed to have a simple structure by using the principle of the inclined plane. This makes it possible to simplify the structure of the clutch actuator to thereby reduce the volume and weight thereof and the cost.

Further, by installing the elastic member at the first end of the lever, an elasticity force is provided in a direction in which the lever is rotated when the lever is rotated to engage with or release the clutch. Accordingly, the elasticity force of the elastic member is added into a torque of the motor required to linearly move the lifting member and thus rotating the lever to thereby serve to assist a necessary force for the linear movement of the lifting member. Accordingly, it is possible to actuate the clutch having a large weight by using the motor having a small capacity.

Furthermore, it is possible to apply such a multiple structure of the clutch actuator to the DCT automated manual transmission. In addition, by installing the clutch actuator in the clutch housing, it is possible to reduce the total length, size and volume of the transmission to thereby improve the layout of the clutch actuator. It is also possible to decrease the noise and vibration generated when the clutch actuator is actuated.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A clutch actuator for a vehicle, comprising:
   a lifting member which has a first end connected to a power generator, a middle portion at which a hinge point is provided, and a second end formed with an inclined plane, the lifting member being linearly moved by receiving a power from the power generator;
   a guide member provided at one side of the second end of the lifting member to facilitate rotation of the second end of the lifting member around the hinge point as the lifting member is linearly moved while the inclined plane is supported; and
   a lever provided at one side of the lifting member and having a first end supported by a clutch housing and a second end configured to rotate around the first end thereof by being pressed by the lifting member according to the movement or rotation of the lifting member, to engage or release a clutch,
   wherein the power generator is a motor, and a rotational movement of the motor is converted to a linear movement of the lifting member by allowing a shaft of the motor to engage with the first end of the lifting member by a structure of a ball screw, to facilitate the linear movement of the lifting member.

2. The clutch actuator of claim 1, wherein the guide member is a roller.

3. The clutch actuator of claim 1, wherein a guide ball is provided on one surface of the lifting member supported by the lever to facilitate a smooth movement of the lifting member.

4. The clutch actuator of claim 1, wherein, by installing an elastic member at the first end of the lever in an elastic state, an elasticity force is provided to the first end of the lever in an opposite direction to the rotating direction of the second end of the lever when the lever is rotated.

5. The clutch actuator of claim 1, wherein the elastic member is a spring.

6. The clutch actuator of claim 1, wherein the clutch actuator is installed in a plural number in the clutch housing, and the clutch actuator is individually installed in each clutch provided in a double clutch.

* * * * *